(12) United States Patent
Chelmis (10) Patent No.: US 10,659,825 B2
(45) Date of Patent: May 19, 2020

(54) METHOD, SYSTEM AND COMPUTER PROGRAM PRODUCT FOR PROVIDING A DESCRIPTION OF A PROGRAM TO A USER EQUIPMENT

(71) Applicant: Alex Chelmis, Brentford (GB)

(72) Inventor: Alex Chelmis, Brentford (GB)

( * ) Notice: Subject to any disclaimer, the term of this patent is extended or adjusted under 35 U.S.C. 154(b) by 0 days.

(21) Appl. No.: 15/250,703

(22) Filed: Aug. 29, 2016

(65) Prior Publication Data

US 2017/0134766 A1 May 11, 2017

(30) Foreign Application Priority Data

Nov. 6, 2015 (GB) .................................. 1519664.5

(51) Int. Cl.
*H04N 21/235* (2011.01)
*H04N 21/258* (2011.01)
*H04N 21/43* (2011.01)
*H04N 21/231* (2011.01)
*H04N 21/435* (2011.01)
(Continued)

(52) U.S. Cl.
CPC ..... *H04N 21/2353* (2013.01); *G06F 3/04842* (2013.01); *G06F 17/212* (2013.01); *H04N 21/23* (2013.01); *H04N 21/231* (2013.01); *H04N 21/23109* (2013.01); *H04N 21/24* (2013.01); *H04N 21/25* (2013.01); *H04N 21/258* (2013.01); *H04N 21/25833* (2013.01); *H04N 21/43* (2013.01); *H04N 21/431* (2013.01); *H04N 21/435* (2013.01);
(Continued)

(58) Field of Classification Search
None
See application file for complete search history.

(56) References Cited

U.S. PATENT DOCUMENTS

| 6,236,395 | B1 * | 5/2001 | Sezan | G06F 17/30035 |
| | | | | 348/E5.105 |
| 6,968,364 | B1 * | 11/2005 | Wong | H04N 5/765 |
| | | | | 348/E7.071 |

(Continued)

FOREIGN PATENT DOCUMENTS

| CN | 104298732 A | 1/2015 |
| EP | 1190574 | 3/2002 |

(Continued)

OTHER PUBLICATIONS

International Search Report for Great Britain Patent Application No. GB1519664.5, dated Apr. 11, 2016.

(Continued)

*Primary Examiner* — Justin E Shepard
(74) *Attorney, Agent, or Firm* — Knobbe, Martens, Olson & Bear, LLP (57) ABSTRACT

The invention relates to a method for providing a description of a program to a user equipment, comprising: receiving a set of text fields associated with the program; selecting a subset of text fields from the set of text fields based on a profile of a user and/or a profile of the user equipment; ordering the selected subset of text fields based on the profile of a user and/or the profile of the user equipment; editing the description of the program based on the ordered subset of text fields; and providing the description of the program to the user equipment.

18 Claims, 6 Drawing Sheets

Program 10

| Nathalie Portman 10a | Chris Hemsworth 10b | Marvel 10c | Epic 10d | Blockbuster 10e |

| Thor 10f | must embark on his most perilous and personal journey yet, one that will reunite him with Jane Foster 10g |

| and for him to sacrifice everything to save humanity 10h | Nominated for best visual effect 10i |

(51) Int. Cl.
*H04N 21/431* (2011.01)
*H04N 21/23* (2011.01)
*H04N 21/24* (2011.01)
*H04N 21/25* (2011.01)
*G06F 3/0484* (2013.01)
*G06F 17/21* (2006.01)
*H04N 21/4722* (2011.01)

(52) U.S. Cl.
CPC ..... *H04N 21/4314* (2013.01); *H04N 21/4358* (2013.01); *H04N 21/4722* (2013.01)

(56) References Cited

U.S. PATENT DOCUMENTS

| | | | | |
|---|---|---|---|---|
| 2002/0083468 | A1* | 6/2002 | Dudkiewicz | H04N 21/4755 725/133 |
| 2004/0194141 | A1* | 9/2004 | Sanders | G06F 17/30817 725/53 |
| 2004/0255321 | A1* | 12/2004 | Matz | H04H 60/16 725/14 |
| 2007/0016401 | A1* | 1/2007 | Ehsani | G10L 15/005 704/9 |
| 2007/0162502 | A1* | 7/2007 | Thomas | G06F 17/3082 |
| 2008/0091652 | A1* | 4/2008 | Tonelli | G06F 16/951 |
| 2009/0019488 | A1* | 1/2009 | Ruiz-Velasco | G06F 3/0482 725/43 |
| 2009/0163137 | A1* | 6/2009 | Capparelli | H04H 60/06 455/3.06 |
| 2009/0292672 | A1* | 11/2009 | Kunjithapatham | G06F 17/30038 |
| 2011/0067059 | A1* | 3/2011 | Johnston | G10L 15/30 725/39 |
| 2011/0078736 | A1* | 3/2011 | Thomas | H04N 21/252 725/40 |
| 2011/0313756 | A1* | 12/2011 | Connor | G06F 17/2276 704/9 |
| 2012/0331438 | A1* | 12/2012 | Moskal | G06F 8/61 717/100 |
| 2013/0083076 | A1* | 4/2013 | Liu | G06F 3/0488 345/660 |
| 2015/0026719 | A1* | 1/2015 | Menon | H04N 21/2668 725/34 |
| 2015/0237389 | A1* | 8/2015 | Grouf | H04N 21/26283 725/49 |

FOREIGN PATENT DOCUMENTS

| | | |
|---|---|---|
| EP | 1463307 A2 | 9/2004 |
| WO | WO 2004/077706 A1 | 9/2004 |
| WO | WO 2006/046807 A1 | 5/2006 |
| WO | WO 2006046807 A1 | 5/2006 |

OTHER PUBLICATIONS

European Search Report completed Nov. 25, 2016 in corresponding European Application No. EP 16 18 4800 filed Aug. 18, 2016.

* cited by examiner

Profile 18a

Age: 42
Gender: Male
Location: London
Interests: Marvel, Blockbuster, Oscar

Fig. 3a

Profile 20a

Age: 57
Gender: Female
Location: London
Interests: Nathalie Portman, Chris Hemsworth

Fig. 3b

Display 26

A Marvel epic blockbuster nominated for best visual effect. Thor must embark on his most perilous and personal journey yet, one that will reunite him with Jane Foster and force him to sacrifice everything to save humanity.

Fig. 4a

Display 26

Thor (Chris Hemsworth) must embark on his most perilous and personal journey yet, one that will reunite him with Jane Foster (Nathalie Portman) and force him to sacrifice everything to save humanity.

METHOD, SYSTEM AND COMPUTER PROGRAM PRODUCT FOR PROVIDING A DESCRIPTION OF A PROGRAM TO A USER EQUIPMENT

CROSS-REFERENCES TO RELATED APPLICATIONS

This application claims priority to Great Britain Patent Application No. 1519664.5 filed on Nov. 6, 2015 in the United Kingdom Intellectual Property Office, the entire content of which is incorporated herein by reference.

FIELD OF THE INVENTION

The invention relates to a method, a system and a computer program product for providing a description of a program (a movie, a TV show, a documentary, a musical, a game or the like) to a user equipment.

BACKGROUND

In conventional TV systems/products (e.g. Youview®) a user can access a list of programs available on a content server for delivery and selects a program in the list. The user can read a description of the selected program to decide whether to watch the selected programme or to select another program in the list. The description is of the nature of a sentence or a few sentences within a single free-form text field. The description is a powerful marketing tool used to elevate the best attributes of a program and to prompt users to watch the program.

A shortcoming arising from conventional TV systems/products is that a generic description is provided to all users and to all user equipments. However, a generic description cannot suit all users because different users make their choices based on different aspects of what is offered. Some users are interested in actors (e.g. Brad Pitt) while others are interested in awards (e.g. awarded an Oscar). Further, not all aspects can be fitted in one generic description especially when the allocated space is limited. Some user equipments have a 150 characters allocated space while others have a 500 characters allocated space. In practice, the size of the generic description may be larger than the size of the allocated space and part of the generic description must be omitted. To the contrary, the size of the generic description may be smaller than the size of the allocated space and the allocated space is not fully used. Consequently, a generic description does not efficiently elevate the best attributes of a programme and does not efficiently prompt users to watch the programme. As a result, the user experience is degraded (the user may decide not to watch a programme although he/she would have liked it) and the profits made by a provider are reduced (less pay per view and advertising revenues). In conventional TV systems/products, providing personalised descriptions tailored to users or to user equipments would require editing the descriptions manually, which is a lengthy and costly task.

The invention aims at addressing these problems.

SUMMARY

The invention relates to a method for providing a description of a program to a user equipment, comprising: receiving a set of text fields associated with the program; selecting a subset of text fields from the set of text fields based on a profile of a user and/or a profile of the user equipment; ordering the selected subset of text fields based on the profile of the user and/or the profile of the user equipment; editing the description of the program based on the ordered subset of text fields; and providing the description of the programme to the user equipment. By so doing, the description of the programme provided to the user equipment is no longer generic. Rather, the description of the programme is tailored to the user and/or to the user equipment. In practice, separate users operating the same user equipment may be provided with separate descriptions of the same program. Likewise, a user operating separate user equipments may be provided with separate descriptions of the same program. The personalised description can be dynamically generated at the time of delivery taking into account changes in the profile of the user and/or the profile of the user equipment without affecting other users and/or user equipments.

According to one feature, the profile of the user includes at least one interest.

According to another feature, at least one interest is derived over time from programs selected and/or watched by the user. By so doing, the profile of the user can be initiated by the user and updated over time by the user equipment.

According to another feature, the profile of the user equipment includes a maximum number of characters determined by the user equipment. By so doing, the number of characters of the description of the program can be adjusted to fit a user equipment's limitation.

According to one feature, editing the description of the program comprises applying at least one grammar rule and/or syntax rule to the ordered subset of text fields to form at least one sentence. By so doing, the description of the program takes the form of a text rather than a mere juxtaposition of text fields. Thus, the fact that the description is edited by a server is transparent to the user.

According to another feature, the set of text fields includes at least one of an award text field, a plot text field, a cast text field and/or a tag text field.

The invention further relates to a system for providing a description of a program to a user equipment, comprising: means for receiving a set of text fields associated with the program; means for selecting a subset of text fields from the set of text fields based on a profile of a user and/or a profile of the user equipment; means for ordering the selected subset of text fields based on the profile of the user and/or the profile of the user equipment; means for editing the description of the program based on the ordered subset of text fields; and means for providing the description of the program to the user equipment.

According to one feature, the profile of the user includes at least one interest.

According to another feature, at least one interest is derived over time from programs selected and/or watched by the user.

According to another feature, the profile of the user equipment profile includes at least a maximum number of characters determined by the user equipment.

According to one feature, the description of the program comprises applying at least one grammar rule and/or syntax rule to the ordered subset of text fields to form at least one sentence.

According to another feature, the set of text fields includes at least one of an award text field, a plot text field, a cast text field and/or a tag text field.

The invention further relates to a system for providing a description of a program to a user equipment, comprising: means for receiving a set of text fields associated with the program; means for selecting a subset of text fields from the set of text fields based on a profile of a user; means for ordering the selected subset of text fields based on the profile of the user; means for editing the description of the program based on the ordered subset of text fields; and means for providing the description of the program to the user equipment.

The invention finally relates to a computer program product comprising code, which when executed by a processor, causes the processor to perform the above method.

The invention has two main advantages.

A first one is marketing driven and personalizes the descriptions of programs based on user profiles, therefore the description area in a product's user interface (UI) becomes the "Real Estate" of program marketing and follows all the rules of targeting advertising. This is an extension of the recommendation engines of today where systems suggest programs based on user profiles. Here we can first exploit the full potential market of one program (the one marketing paid a lot of money to acquire) by customizing its selling pitch (description) and only then move to suggest something else. This is actually a merge between two marketing techniques that until now had conflicting strategies.

The second one is a business driven idea and has some more tangible operational cost benefits. Today the program descriptions are pre-fabricated (curated prior to broadcast) to fit a specific device's allocated space. Content servers might hold a number of different descriptions lengths (all manually curated) in order to accommodate different needs. Here the descriptions are dynamically constructed to fit any device that requests a description according to its specifications and limitations. This allows to UI developers to allocate any text field size they want without being restricted to the content server availability and most importantly change the design (shrink-expand the description presentation field) whenever they want. Multiple devices or multiple versions of UI in the same device can be supplied by the system instantly and simultaneously without the need to re-author descriptions in the content server. This is a significant cost saving process as well as a powerful enablement tool of future UI designs.

Other features and advantages of the invention will become apparent after review of the entire application, including the following sections: brief description of the drawings, detailed description and claims.

BRIEF DESCRIPTION OF THE DRAWINGS

The accompanying drawings illustrate exemplary aspects of the invention, and, together with the general description given above and the detailed description given below, serve to explain features of the invention.

FIG. 4a shows a display of a user equipment displaying a description of a program when this program has been selected by the user of FIG. 3a;

DETAILED DESCRIPTION

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Figure 1:
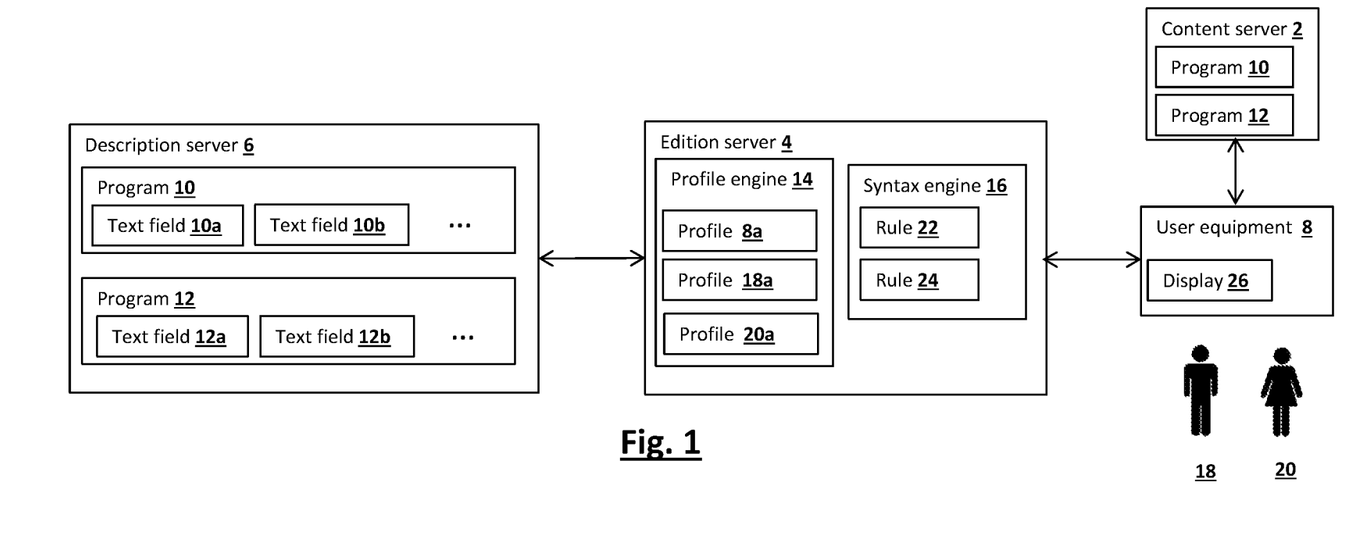
FIG. 1 shows a system for providing a description of a program to a user equipment according to an aspect of the invention.

FIG. 1 shows a system for providing a description of a program to a user equipment. The system comprises a content server 2, an edition server 4, a description server 6 and a user equipment 8. The user equipment 8 may be any client device including a television, a desktop computer, a laptop computer, a tablet, a smart phone or the like. It may be connected to the edition server 4 and the content server 2 by internet protocol with a real-time reverse link. Alternatively, it may be connected to the edition server 4 and the content server 2 by cable or satellite, in which case it may be a one-way forward link in real time, with an offline reporting link for later reporting what was watched (and/or browsed) and when. The skilled person would understand that the content server 2, the edition server 4 and the description server 6 have been represented as separate servers, however they can be part of a same server.

The content server 2 stores a plurality of programs 10 and 12. A programme can be any content including (a movie, a TV show, a documentary, a musical, a game or the like).

The description server 6 stores a set of text fields 10a to 10i and 12a to 12i associated with the programs 10 and 12. A text field can be a cast text field, a plot text field, a tag text field, an award text field or the like. The set of text fields 10a to 10i associated with the program 10 will be described further below with reference to FIG. 2.

The edition server 4 comprises a profile engine 14 and a syntax engine 16.

The profile engine 14 stores a profile 8a associated with the user equipment 8 and profiles 18a and 20a associated with users 18 and 20.

The profile 8a can include a maximum number of characters for a description, a maximum number of characters for a title, a type of user equipment (e.g. laptop, smartphone, tablet, TV), an image requirement (e.g. size or resolution) or preferences (e.g. actors are not to be used in a description because they are displayed separately, genre is not to be used in a description because it is displayed separately, parental guidance is to be mentioned with a logo or otherwise with a string of characters at the end of the description, a definition of the program (e.g. High or standard) is to be mentioned with a logo or otherwise with a string of characters at the end of the description.

The profile 18a or 20a can include attributes such as an age, a gender, an occupation, a location, interests or the like. Additionally or alternatively, it can record relative likes and dislikes (weightings) among attribute types, among attribute groupings or among attributes. The profiles 18a and 20a may be initiated by the users 18 and 20 by accessing the editing server and filling a form (e.g. "on a scale of 1 to 5, is attribute type A more important to you or attribute type B" or "do you prefer actors A and B or actors C and D", where actors A and B are from one group and actors C and D are from another, or "how do you rate actor A, actor B", etc.). The profiles 18a and 20a may be updated over time based on programs browsed and/or selected by the users 18 and 20. For example, any time a user selects a program, the set of text fields associated with the selected program are added to the interests. The profiles 18a and 20a will be described further below with reference to FIGS. 3a and 3b.

The syntax engine 16 stores rules 22 and 24 for editing at least once sentence based on text fields.

The user equipment 8 is equipped with a display 26.

Figure 2:
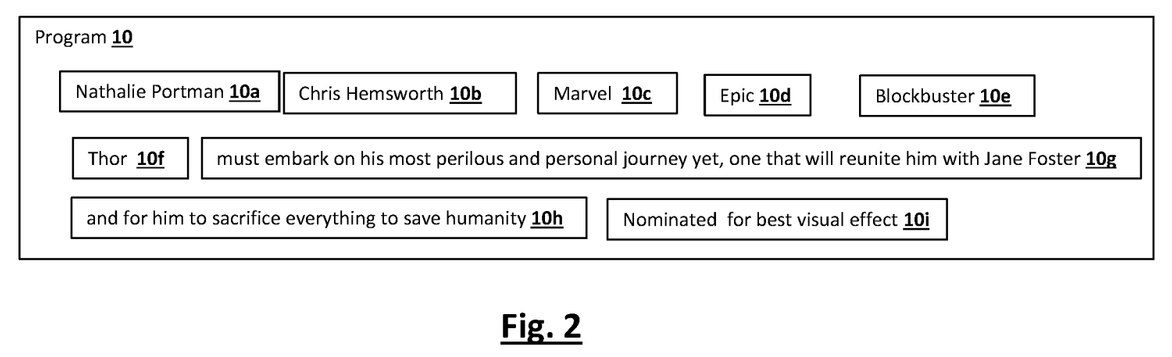
FIG. 2 shows a set of text fields associated with a program in the system of FIG. 1.

FIG. 2 shows the set of text fields 10a to 10i associated with the program 10. The set of text fields 10a includes cast text fields 10a and 10b ("Nathalie Portman" and "Chris Hemsworth"), tag text fields 10c, 10d and 10e ("Blockbuster", "Marvel", "Epic") plot text fields 10f, 10g and 10h ("Thor", "Must embark on his most perilous and personal journey yet, one that will reunite him with Jane Foster", "And for him to sacrifice everything to save humanity") and an award text field 10i ("nominated for best visual effect").

Figure 3A:
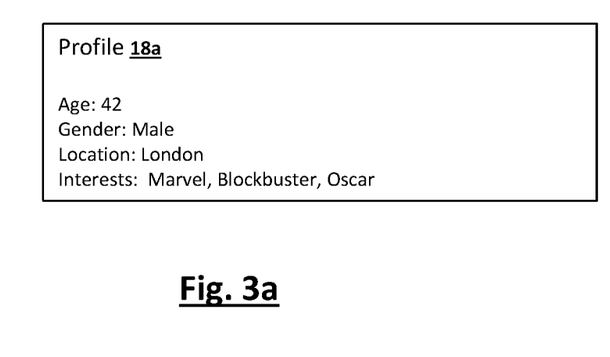
FIG. 3a shows a profile of a user in the system of FIG. 1.

FIG. 3a shows the profile 18a of the user 18. The profile 18a comprises an age ("42"), a gender ("male"), a location ("London") and interests ("Oscar", "Marvel").

Figure 3B:
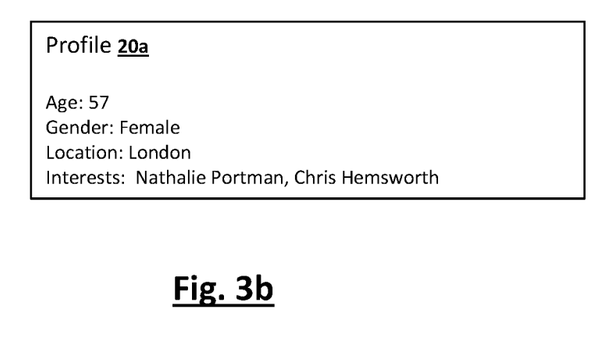
FIG. 3b shows a profile of another user in the system of FIG. 1.

FIG. 3b shows the profile 20a of the user 20. The profile 20a comprises an age ("57"), a gender ("female"), a location ("London") and interests ("Nathalie Portman", "Chris Hemsworth").

Figure 4A:
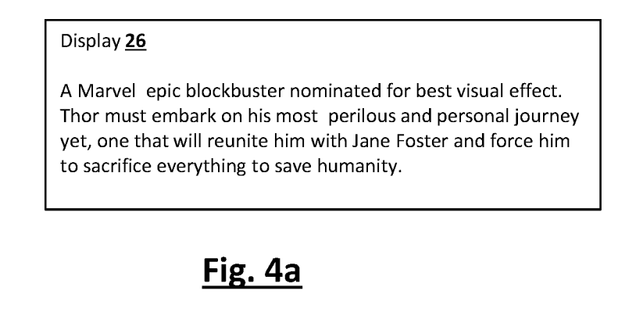

FIG. 4 shows the display 26 of the user equipment 8 displaying a description of the program 10 when the program 10 has been selected by the user 18.

Figure 4B:
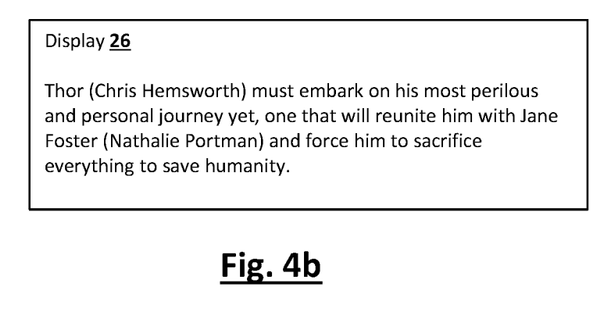
FIG. 4b shows a display of a user equipment displaying a description of program when this program has been selected by the user of FIG. 3b.

FIG. 4b shows the display 26 of the user equipment 8 displaying a description of the program 10 when the program 10 has been selected by the user 20.

Figure 5:
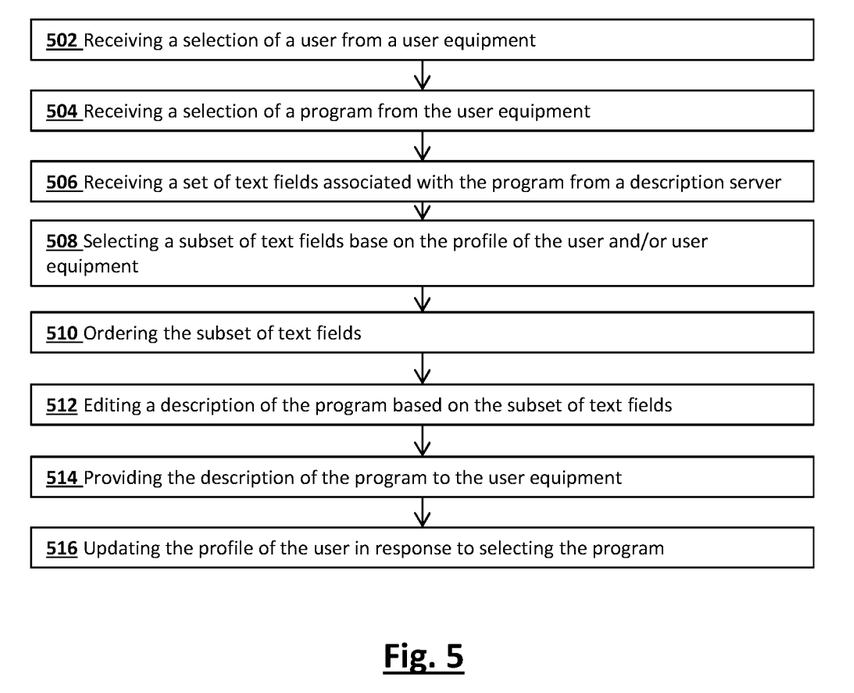
FIG. 5 shows a flow chart of a method for providing a description of a programme to a user equipment in the system of FIG. 1.

FIG. 5 shows a flow chart of a method for providing a description of a program to the user equipment 8.

At step 502, the edition server 4 receives a selection of a user from the user equipment 8. For example, the selected user is the user 18.

At step 504, the edition server 4 receives a selection of a program from the user equipment 8. For example, the display 28 displays a list of programs available on the content server 2 and the user selects the program 10. This act of selecting may be in response to a user "clicking" or "mousing over" a button or link.

At step 506, the profile engine 14 receives the set of text fields 10a to 10i associated with the program 10 from the description server 6.

At step 508, the profile engine 14 selects a subset of text fields based on the profile 8a and/or profile 18a. For example, the profile engine 14 determines that the user 18 has an interest for some categories of text fields based on the profile 18a. Then the profile engine 14 selects any text fields of the set of text fields 10a to 10i that belongs to these categories. Here, the profile engine 14 determines that the user 18 has an interest for tag text fields and award text fields. Then the profile engine 14 selects the tag text fields 10c, 10d and 10e ("Marvel", "Epic", Blockbuster") and the award text field 10i ("Nominated for best visual effect").

The subset of text fields may further be selected based on the maximum number of characters. As the maximum has not been reached, the profile engine 14 further selects the plot text fields 10f, 10g and 10h ("Thor", "Must embark on his most perilous and personal journey yet, one that will reunite him with Jane Foster", "And for him to sacrifice everything to save humanity").

At step 510, the profile engine 14 orders the subset of text fields based on the profile 8a and/or profile 18a. For example, the profile engine 14 determines that the user 18 has a greater interest for some categories of text fields based on the profile 18a. Then, the profile engine orders the selected text fields accordingly. Here, the profile engine determines that the user has a greater interest for tag text fields than award text fields and plot text fields. The profile engine 14 orders the selected text fields 10c, 10d, 10e, 10i, 10f, 10g and 10h ("Marvel", "Epic", Blockbuster", "Nominated for best visual effect", "Thor", "Must embark on his most perilous and personal journey yet, one that will reunite him with Jane Foster", "And for him to sacrifice everything to save humanity").

At step 512, the syntax engine 16 edits a description of the program 10 ("A Marvel epic blockbuster nominated for best visual effect. Thor must embark on his most perilous and personal journey yet, one that will reunite him with Jane Foster and for him to sacrifice everything to save humanity") by applying the rules 22 and 24 to the ordered subset of text fields.

At step 514, the edition server 4 provides the description of the program 10 to the user equipment 8. The description of the program 10 is displayed by the display 26 (see FIG. 4a). If the user 18 decides to watch the program 10, the user equipment 8 streams or downloads the program 10 from the content server 2.

At step 516, the profile engine 14 updates the profile 18a based on the selected program 10. For example, the set of text fields 10a to 10i are added to interests in the profile 18a.

It should be understood that at step 508, the profile engine 14 could have selected the subset of text fields in another manner. For example, the profile engine 14 could have determined that the user 18 has an interest for specific text fields based the profile 18a. Then the profile engine 14 could have selected the specific text fields if they were also in the set of text fields 10a to 10i.

Likewise, at step 510, the profile engine 14 could have ordered the subset of text fields in another manner. For example, the profile engine 14 could have determined that the user 18 had a greater interest for specific text fields based on the profile 18a and could have ordered the subset of text fields accordingly.

Note that in the case where a user profile gives preference for one category of text fields (e.g. cast text fields) over another (e.g. award text fields), the result may be that, in the first few words of the resultant description, the user is presented with actors who are not of special interest to that user. This may increase the likelihood of the user rejecting that program, but nevertheless, this is based on a more informed choice (for that user), because that user is more certain in his or her choice. Giving a user a more informed choice based on individual interests reduces the time taken to browse for programs of interest, reduces information flow necessary to enable the user to make a choice and increases the time available for that user to watch a program that may be revenue-based.

Figure 6:
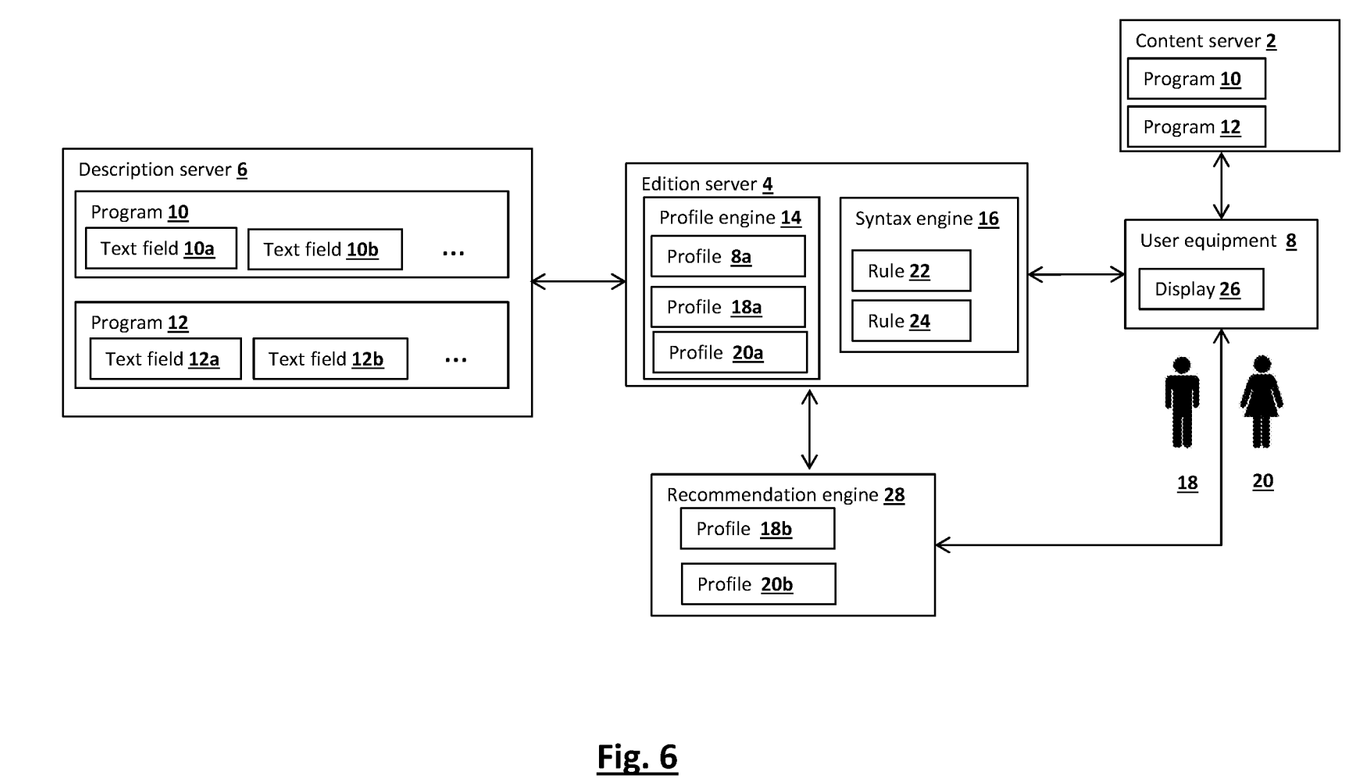
FIG. 6 shows another system for providing a program to a user equipment according to the invention.

FIG. 6 shows another system for providing a description of a program to the user equipment 8. The system is identical to the system of FIG. 1 except that it further comprises a recommendation engine 28.

The recommendation engine 28 stores additional profiles 18b and 20b of the users 18 and 20. Like the profiles 18a and 20a, the profiles 18b and 20b include interests of the users 18 and 20. The profiles 18b and 20b may be initiated and updated over time based on programs watched by the users 18 and 20. For example, any time a user watches a program, the set of text fields associated with the program are added to the profile of the user.

Figure 7:
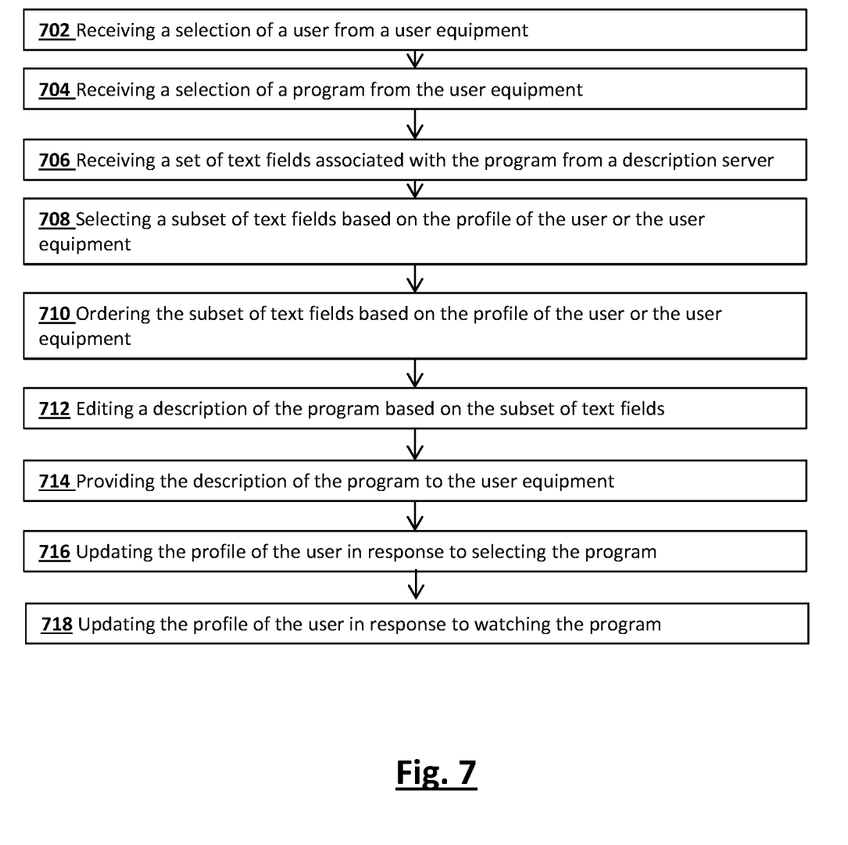
FIG. 7 shows a flow chart of a method for providing a description of a program to a user equipment in the system of FIG. 6.

FIG. 7 shows a flow chart of another method for providing a description of a program to the user equipment 8.

At step 702, the edition server 4 receives a selection of a user from the user equipment 8. For example, the selected user is the user 20.

At step 704, the edition server 4 receives a selection of a program from the user equipment 8. For example, the display 28 displays a list of programs that are not only available on the content server 2 but recommended by the recommendation engine 28. Here, the user selects the program 10. The recommendation engine 28 can based its recommendation on the interests included in the profile 20b. This act of selecting may be in response to a user "clicking" or "mousing over" a button or link.

At step 706, the profile engine 14 receives the set of text fields 10a to 10i associated with the selected program 10 from the description server 6.

At step 708, the profile engine 14 selects a subset of text fields based on the profile 8a and the profile 20a. For example, the profile engine 14 determines that the user 20 has an interest for some categories of text fields based on the profile 18a. Then, the profile engine 14 selects any text fields of the set of text fields 10a to 10i that belongs to these categories. Here, the profile engine 14 determines that the user 20 has an interest for cast text fields. Then, the profile engine 14 selects the cast text fields 10a and 10b ("Nathalie Portman" and "Chris Hemsworth").

The subset of text fields may further be selected based on the maximum number of characters. As the maximum limit has not been reached, the profile engine 14 further selects the plot text fields 10f, 10g and 10h ("Thor", "Must embark on his most perilous and personal journey yet, one that will reunite him with Jane Foster", "And for him to sacrifice everything to save humanity").

At step 710, the recommendation engine 28 orders the subset of text fields based on the profile 8a and/or the profile 20b. For example, the recommendation engine 28 determines that the user 20 has a greater interest for some categories of text fields and orders the selected text fields accordingly. Here, the recommendation engine 28 determines that the user has a greater interest for cast text fields and then plot text fields. The, the recommendation engine 28 orders the selected text fields accordingly 10a, 10b, 10f, 10g and 10h ("Nathalie Portman" and "Chris Hemsworth", "Thor", "Must embark on his most perilous and personal journey yet, one that will reunite him with Jane Foster", "And for him to sacrifice everything to save humanity").

At step 712, the syntax engine 16 edits a description of the program 10 ("Thor (Chris Hemsworth) must embark on his most perilous and personal journey yet, one that will reunite him with Jane Foster (Nathalie Portman) and for him to sacrifice everything to save humanity") by applying the rules 22 and 24 to the ordered subset of text fields. As can be seen, the syntax engine 16 may reorder the text fields while attempting to maintain the order presented to it as a preferred constraint.

At step 714, the edition server 4 provides the description of the program 10 to the user equipment 8. The description of the program 10 is displayed by the display 26 (see FIG. 4b). If the user 20 decides to watch the program 10, the user equipment 8 streams or downloads the program 10 from the content server 2.

At step 716, the profile engine 14 updates the profile 20a based on the selected program 10. For example, the set of text fields 10a to 10i are added to the interests in the profile 20a.

At step 718, the recommendation engine 28 receives an indication (via the real time reverse link or the offline reporting link) that the user 20 has watched the program 10. The recommendation engine 28 updates the profile 20b accordingly. For example, the set of text fields 10a to 10i are added to the interests in the profile 20b. The indication can be received directly from the user equipment 8 or indirectly from the user equipment 8 via the edition server 4.

It should be understood that at step 708, the profile engine 14 could have selected the subset of text fields in another manner. For example, the profile engine 14 could have determined that the user 20 has an interest for specific text fields based on the profile 20a. Then, the profile engine 14 could have selected these specific text fields if they were also in the set of text fields.

Likewise, at step 710, the recommendation engine 28 could have selected the subset of text fields in another manner. For example, the recommendation engine 28 could have determined that the user 20 has a greater interest for specific text fields and could have ordered the selected text fields accordingly.

It will be understood that above embodiments of the present invention have been described by way of example only, and that various changes and modifications may be made without departing from the scope of the invention.

The invention claimed is:

1. A method for communicating with a user equipment, comprising:
    storing a profile of a user and/or the user equipment, including a maximum number of characters of at least one display field in the user equipment, in at least one storage device of at least one server;
    storing, in the at least one storage device, a set of data fields associated with a program, wherein the data fields define a first description of the program;
    monitoring, using the server, the user equipment via a wired and/or wireless communication link;
    updating, using the server, the profile of the user and/or the user equipment based on monitoring the user equipment;
    constructing, using the server, a second description of the same program based on the updated profile of the user and/or the user equipment and based on not exceeding the maximum number of characters, the second description comprising a subset of data fields from the set of data fields, the subset of data fields placed in an order that is based on an order specified by the updated profile of the user and/or the user equipment; and
    transmitting over the wired and/or wireless communication link, using the server, the second description of the program to be displayed on the user equipment.

2. The method of claim 1, wherein the profile of the user includes at least one interest.

3. The method of claim 2, wherein the at least one interest is derived over time from at least one of programs selected by the user or programs watched by the user.

4. The method of claim 1, wherein the maximum number of characters is determined by the user equipment.

5. The method of claim 1, wherein constructing the second description of the program comprises applying at least one grammar rule and syntax rule to the ordered subset of data fields to form at least one sentence.

6. The method of claim 1, wherein the set of data fields includes at least one of an award text field, a plot text field, a cast text field or a tag text field.

7. A system for communicating with a user equipment, comprising:
at least one storage device configured to store a profile of a user and/or the user equipment, including a maximum number of characters of at least one display field in the user equipment, the at least one storage device further configured to store a set of data fields associated with a program, the data fields defining a first description of the program; and
at least one server configured to:
monitor the user equipment via a wired and/or wireless communication link;
update the profile of the user and/or the user equipment based on monitoring the user equipment;
construct a second description of the same program based on the updated profile of the user and/or the user equipment and based on not exceeding a maximum number of characters, the second description comprising a subset of data fields from the set of data fields, the subset of data fields placed in an order that is based on an order specified by the updated profile of the user and/or the user equipment; and
transmit over the wired and/or wireless communication link the second description of the program to be displayed on the user equipment.

8. The system of claim 7, wherein the profile of the user includes at least one interest.

9. The system of claim 8, wherein the at least one interest is derived over time from at least one of programs selected by the user or programs watched by the user.

10. The system of claim 7, wherein the maximum number of characters is determined by the user equipment.

11. The system of claim 7, wherein constructing the second description of the program comprises applying at least one grammar rule or syntax rule to the ordered subset of data fields to form at least one sentence.

12. The system of claim 7, wherein the set of data fields includes at least one of an award text field, a plot text field, a cast text field and a tag text field.

13. A non-transitory computer readable medium comprising code, implemented using one or more computing devices, which when executed by a physical processor, causes the processor to perform a method comprising:
monitoring a user equipment via a wired and/or wireless communication link;
updating a profile of a user and/or the user equipment, including a maximum number of characters of at least one display field in the user equipment, based on monitoring the user equipment;
constructing a personalized description of a program based on the updated profile of the user and/or the user equipment and based on not exceeding a maximum number of characters, the personalized description comprising a subset of data fields from a set of data fields associated with the program, the subset of data fields placed in an order that is based on an order specified by the updated profile of the user and/or the user equipment; and
transmitting the personalized description of the program to be displayed on the user equipment over the wired and/or wireless communication link,
wherein the profile of the user and/or the user equipment is stored in at least one storage device, and
wherein the set of data fields associated with the program is stored in the at least one storage device, the data fields defining a generic description of the program.

14. The non-transitory computer readable medium of claim 13, wherein the profile of the user includes at least one interest.

15. The non-transitory computer readable medium of claim 14, wherein the at least one interest is derived over time from at least one of programs selected by the user or programs watched by the user.

16. The non-transitory computer readable medium of claim 13, wherein the maximum number of characters is determined by the user equipment.

17. The non-transitory computer readable medium of claim 13, wherein constructing the personalized description of the program comprises applying at least one grammar rule or syntax rule to the ordered subset of data fields to form at least one sentence.

18. The non-transitory computer readable medium of claim 13, wherein the set of data fields includes at least one of an award text field, a plot text field, a cast text field and a tag text field.

* * * * *